United States Patent [19]

Williamson, III

[11] E Re. 28,788

[45] Reissued Apr. 27, 1976

[54] LOAD RESTRAINER

[76] Inventor: George R. Williamson, III, 1034 Lioncrest Drive, Richton Park, Ill. 60471

[22] Filed: Apr. 10, 1975

[21] Appl. No.: 566,838

Related U.S. Patent Documents

Reissue of:

[64] Patent No.: 3,782,758
Issued: Jan. 1, 1974
Appl. No.: 289,955
Filed: Sept. 18, 1972

[52] U.S. Cl. ..... 280/179 R; 105/376; 160/84 R

[51] Int. Cl.[2] ..... B60P 7/00

[58] Field of Search ..... 280/179 R, 179 A; 105/369 R, 369 B, 376; 62/329; 16/87.6; 160/368 G; 49/177; 119/11

[56] References Cited

UNITED STATES PATENTS

| | | | |
|---|---|---|---|
| 980,789 | 1/1911 | Jeffery | 160/368 |
| 2,769,405 | 11/1956 | Nystrom | 280/179 X |
| 2,825,600 | 3/1958 | Macomber | 105/376 X |
| 2,827,958 | 3/1958 | Lee | 105/376 |
| 3,256,837 | 6/1966 | Blatt | 105/376 |
| 3,376,599 | 4/1968 | Singer | 16/87.6 |
| 3,638,450 | 2/1972 | Falk | 62/329 |

*Primary Examiner*—M. H. Wood, Jr.
*Assistant Examiner*—R. Schrecengost
*Attorney, Agent, or Firm*—Norman Lettvin; Gerald S. Geren

[57] ABSTRACT

A unitary load retainer or restrainer system for a vehicular load carrying container or the like, including a supporting sheet of material suspended from a horizontal rod that rides in tracks so that the restraining system may be moved fore and aft within the container as desired, the supporting sheet material being provided with a plurality of horizontally extending slots that receive load restraining belts having fasteners at either end that are connectable to openings in logistic rails that extend along the interior of the container, the slots in the supporting sheet of material permitting vertical adjustment of the horizontal belts to accommodate for different locations of the logistic rails within different vehicular containers, there being also provided means for loosely holding the belts within the slots so that the belts may not be inadvertently removed from the supporting sheet of material and lost, there being also provided a draw strap having a plurality of slots that receive the belts and a portion which extends up over the horizontal sliding rod at the top of the container with a fastener at the end thereof that may be fixed in any one of the logistic rails as desired to draw the entire supporting sheet and belts to the top of the vehicular container during non-use or loading of the container.

21 Claims, 5 Drawing Figures

LOAD RESTRAINER

Matter enclosed in heavy brackets [ ] appears in the original patent but forms no part of this reissue specification; matter printed in italics indicates the additions made by reissue.

BACKGROUND OF THE PRESENT INVENTION

The present invention relates to load dividers and restrainers for vehicular containers that serve either to separate portions of the load within the container or restrain part or all of the load within the container. Most vehicles are specially constructed to receive various types of load restraining or dividing devices. One such special adaptation includes a plurality of horizontally extending "logistic rails" fixed to the sides of the container and extending fore and aft therein. These "logistic rails" include metal channels that have a plurality of slots therein. These slots receive fasteners that are fixed to the ends of bars or flexible belts that extend across the inside of the container.

The use of these belts or bars has raised serious problems in the transportation industry.

In the transportation industry, it is quite common to transfer loads or partial loads from one carrier to another carrier in the goods route to their destination. Such a transfer involves the unloading of one vehicle, such as a railroad car, and the subsequent loading of the removed goods onto another vehicle such as a semi-trailer. During such transfers, it is very common for the restraining belts or bars to be inadvertently, or sometimes intentionally through theft, removed from one of the vehicles. This is a considerable problem because of the significant cost of continually replacing the belts or bars which are normally assigned to a specific vehicle or container.

While there has been no attempt in the past to solve the problem of restraining belt and bar loss, there have been provided several forms of partitions or restrainers in vehicular containers that require some comment. One such retainer consists of a rigid wall mounted toward the rear of the vehicular container and swingable from a downward lower position to an upward loading position. For holding the rigid panel in the retaining position, a hydraulic jack mechanism is provided that engages the sides of the container. This structure is extremely costly, subject to constant malfunction, and difficult for freight handlers to operate properly. Moreover, the structure is extremely expensive and when damaged is very costly to replace or repair.

The Jeffrey U.S. Pat. No. 980,789, issued Jan. 3, 1911, shows a chain network separator for an animal shelter. The problem of belt or bar loss is not presented in the animal shelter environment, which no doubt is on a farm, and moreover, the horizontal chains must be aligned with the enclosure side boards to provide maximum load restraining capabilities.

The Falk U.S. Pat. No. 3,638,450 shows a flexible curtain that separates a container and rolls up for storage at the top of the container, but fails to teach any novel manner of attaching the end of the draw cord to the container side walls.

The Singer U.S. Pat. No. 3,376,599 shows an axially movable bulkhead for a refrigeration container, but the curtain is transversely foldable for loading and unloading and provides an extremely complicated and expensive structure.

It is a primary object of the present invention to minimize the problems set forth in the prior art.

SUMMARY OF THE INVENTION

In accordance with the present invention, a load divider and restrainer is provided for a vehicular container that is unitary in construction and carries a plurality of restraining belts that may not be removed from the vehicle. The load restrainer is axially slidable on horizontally extending tracks of the top of the container from one end of the container to the other to separate the load or restrain the load wherever desired in the vehicle. If desired, more than one load divider restrainer may be provided in the same set of tracks to restrain or divide the load at multiple points.

Toward this end, a horizontal rod having guides slidable in the track supports a looped piece of canvas hanging vertically within the container almost to the floor thereof. A plurality of horizontal sew lines, fixing the sides of the looped canvas sheet together define horizontal slots which each receive a conventional restraining belt with logistic clips fixed to either end thereof. These belts serve the conventional restraining function and very importantly, the slots in the looped canvas support for the belts permit the belts to be vertically adjusted to accommodate logistic rails at varying heights. This is extremely important, since the height of the logistic rails in one vehicle may vary widely from the height of the logistic rails in another vehicle, and thus, the present load restrainer and divider system is adaptable to different vehicular containers with differently positioned logistic rails.

To prevent the loss or removal of the belts from the canvas support, straps are provided between the looped canvas support that are fixed to the support and also fixed to the belts, but these straps do not inhibit the vertical positioning of the belts within the looped canvas pockets.

To facilitate loading and unloading of the vehicle, the present restrainer system is retractable to a position at the top of the container by straps at each side of the canvas support which are looped over the top bar and have fasteners at the end thereof which clip into the logistic side rails within the vehicular container.

Thus, the primary purpose of the present system is to function as a cargo holding or dividing device. It is primarily designed to maintain the vehicular container's load of cargo safely supported or divided to prevent damaged freight and to afford segregation of cargo while in transit between or within shipping or receiving facilities.

The present system is practically maintenance free; there are only 11 component parts and of these only two parts, the buckles and the fitting, have removable parts. Both of these parts are readily accessible and inexpensive. The belts and the buckles can also be adapted to existing equipment without special or new rails or new tracks being installed.

Another advantage is that the present system eliminates costly blocking and bracing and provides a dependable consistent carrier with a liability claim prevention device.

The forward and the backward strength of the unit may approach 40,000 pounds of direct force and accommodates most all types of loaded cargo.

Because of the short axial length of the present sys-
em, or thinness thereof, every slot in the logistic rails
1 the container side walls may be employed.

Moreover, the system adds extra protection to the
ost vulnerable area of the trailer or container near its
ear doors.

Still further, another advantage of the present inven-
on is that minimal educational processes are required
or the freight handlers in order to operate the same.

DETAILED DESCRIPTION OF THE PREFERRED EMBODIMENT

Figure 1:
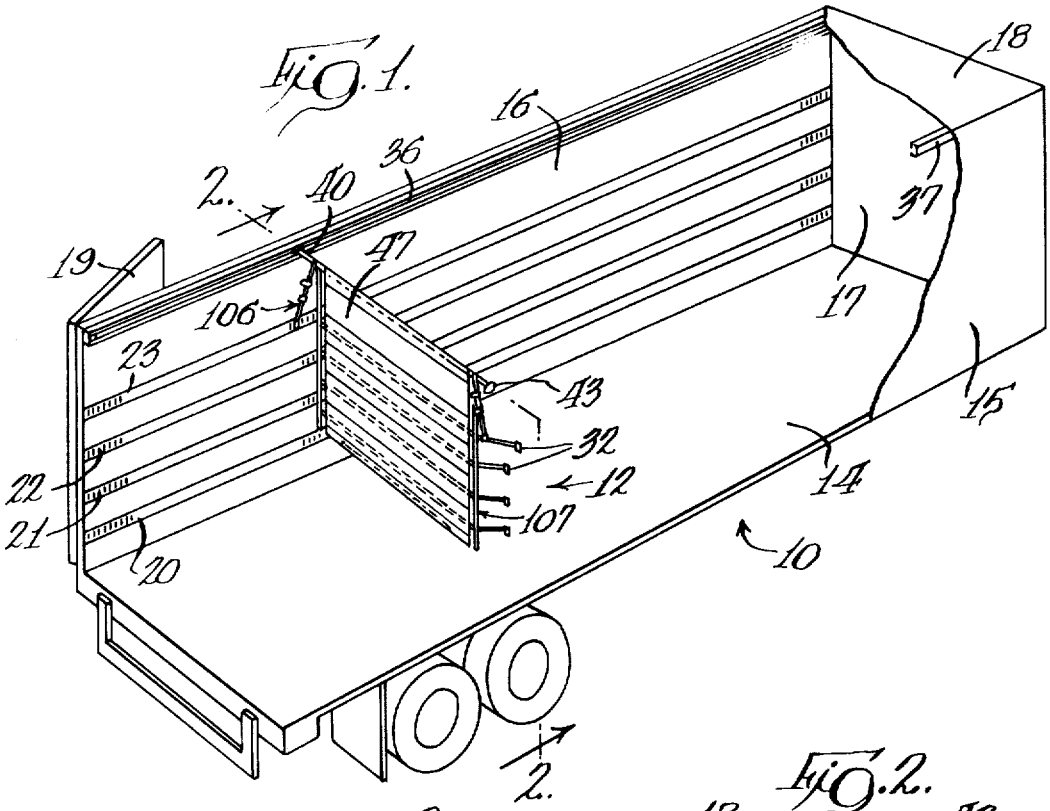
FIG. 1 is a perspective view, partly broken away,
lustrating a semi-trailer with the present load divider
nd restrainer.
Figure 2:
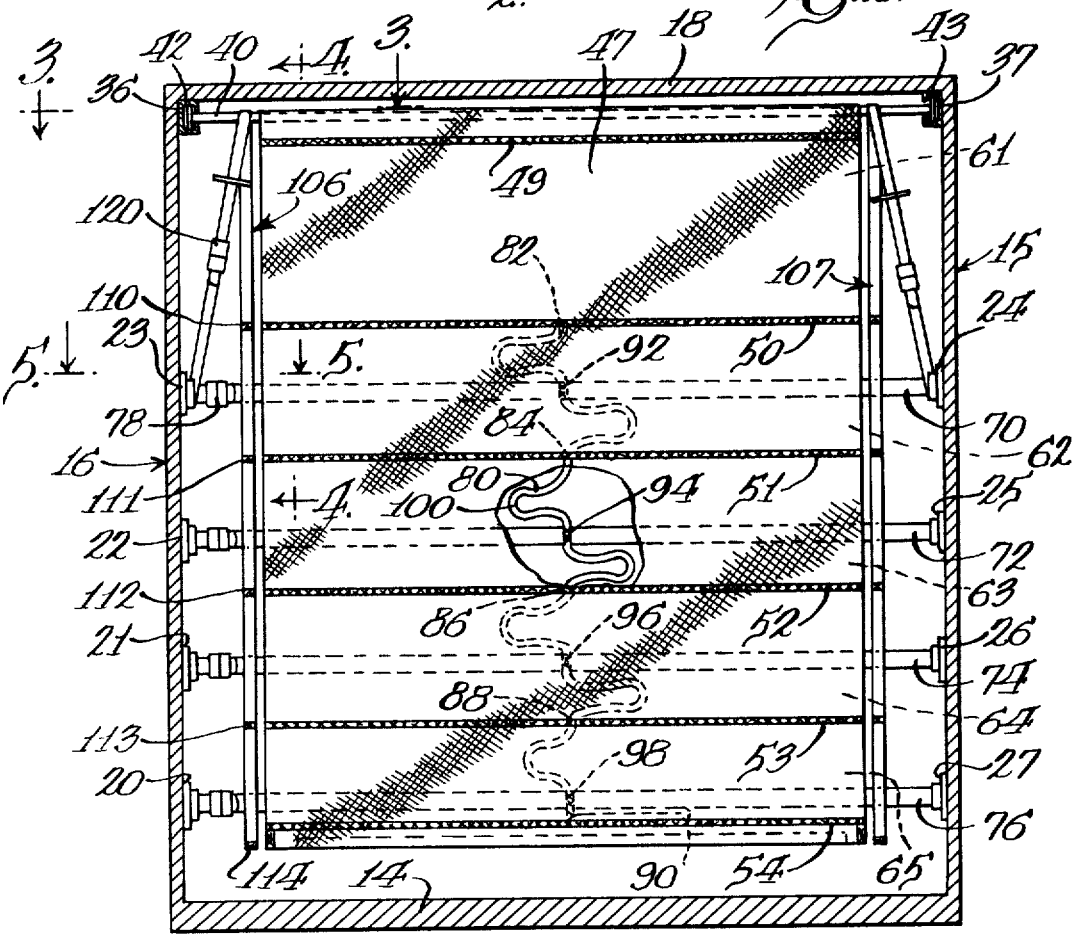
FIG. 2 is an enlarged cross section of the semi-trailer
hown in FIG. 1 taken generally along line 2—2 of FIG.
Figure 3:
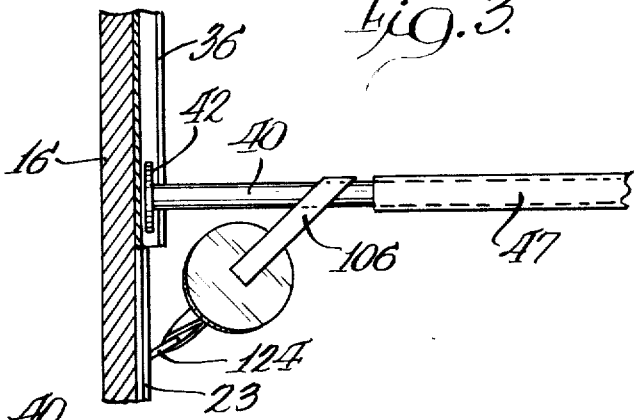
FIG. 3 is a fragmentary top view of the draw strap
echanism taken generally along line 3—3 of FIG. 2.

Referring to the drawings and particularly FIGS. 1
nd 2, a semi-trailer 10 is illustrated having slidable
erein a load divider and restraining system 12 accord-
g to the present invention. The load restraining and
ividing mechanism 12 may be employed to divide one
ad from another load when multiple shipments are
arried, using one or more of the systems 12, or may
mply be used as a load restrainer holding the load
ecurely in position when less than a full container is
equired to receive the load.

The container 10 includes a bottom wall 14, side
alls 15 and 16, front wall 17, top wall 18 and a rear
oor 19.

Figure 4:
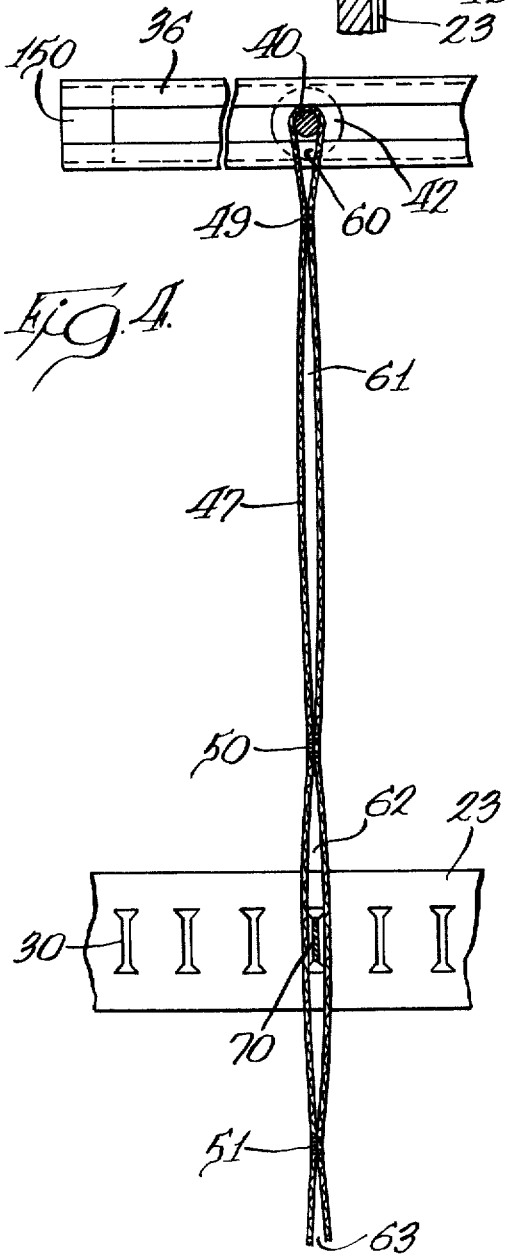
FIG. 4 is a cross section taken generally along line
—4 of FIG. 2 illustrating the canvas support loops;
nd
Figure 5:
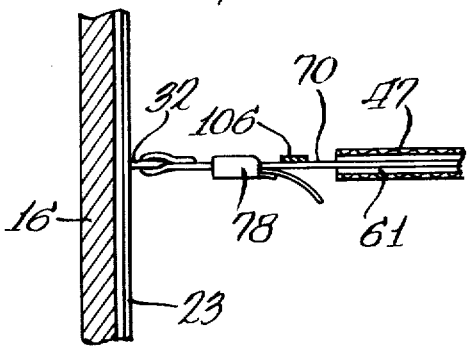
FIG. 5 is a cross section taken generally along line
—5 of FIG. 2 illustrating the interconnection between
e straps and the logistic side rails of the container.

Mounted on the side walls 15 and 16 are logistic rails
0, 21, 22 and 23 on wall 16 and rails 24, 25, 26 and 27
n wall 15. As seen in FIG. 4, the logistic rails have a
lurality of I-shaped slots 30 therein that receive and
old clips 32 as shown in FIGS. 1 and 5.

It should be understood that the dividing and re-
raining system 12 may be used with fastening devices
ther than the logistic rails 20, etc. For example, the
ils may be vertically positioned rather than horizon-
lly positioned as shown in the drawings.

For the purpose of permitting the load restrainer and
ivider 12 to be positioned at any location throughout
e length of the trailer 10, channel-shaped tracks 36
d 37 are provided at the top inside of the side walls
6 and 15, respectively. These tracks 36 and 37 are
asily roll formed and inexpensive in construction, and
e connected by suitable threaded fasteners to the
alls 16 and 15. This simple attachment of the tracks
6 and 37 permits the present load retaining system 12
be easily incorporated into existing vehicle contain-
s, as well as being an original equipment installation.

To slidably support the restrainer system 12 within
e tracks 36 and 37, a horizontally disposed steel rod
0 is provided having circular discs 42 and 43 fixed to
e ends thereof and slidable in the channel-shaped
acks 36 and 37, respectively.

Suspended from the rod 40 is a wide loop of canvas 47 that extends double fold substantially the height of the interior of the container 10 and also substantially across the width of the container. As seen more clearly in FIG. 4, the canvas supporting web 47 has sew lines 49, 50, 51, 52, 53 and 54 that extend horizontally completely across the supporting canvas 47 defining slots 60, 61, 62, 63, 64 and 65 between the sides of the canvas member 47. The slot 60 receives the rod 40, the slot 62 receives a restraining strap 70, the slot 63 receives a restraining strap 72, the slot 64 receives a restraining strap 74, and the slot 65 receives a restraining strap 76.

The restraining straps 70, 72, 74 and 76 serve primarily as retaining and restraining elements which carry the main portion of the load in restraining the load and holding it in position. However, the canvas 47 between the straps also serves a dividing and restraining function.

The belts 70, etc., have buckle assemblies 78 that permit the belts to be tightened or loosened to their proper position. At each end of the belts 70, 72, 74 and 76 are fixed fastening clips 32 which fit into the I-shaped slots 30 in the logistic side rails 20, etc., as described above.

To assure a maximum load carrying capability of the belts 70, 72, 74 and 76, they are vertically positionable with respect to the supporting canvas 47. Toward this end, the belts are freely movable vertically between the sew lines, such as 50, 51, in the canvas 12. This permits the belts to remain horizontal in their load carrying position, and thus, they have their maximum load carrying capability, which of course they would not have if they were not substantially horizontal throughout the length thereof.

For the purpose of preventing removal of the belts 70, 72, 74 and 76 from the supporting canvas 47, a strap 80 is sewn between the canvas loop 47 at points 82, 84, 86, 88 and 90. The strap 80 is fixed to the belts 70, 72, 74 and 76 by sew points 92, 94, 96 and 98. The loops 100 in the strap 80 between the sew points at the canvas 47 and the belts permit the free movement of the belts vertically within the pockets between the canvas 47, but prevent the complete removal of the belts from the supporting canvas 47.

During unloading and loading, or when the restrainer system 12 is not in use, it is stowable at the top of the container 10. Toward this end, straps 106 and 107 are provided at each side of the canvas 47. In a similar fashion to the canvas, the straps 106 and 107 are double folded and have sew points as indicated at 110, 111, 112, 113 and 114 defining loops which receive the belts 70, 72, 74 and 76. The straps 106 and 107 are folded across the top of the rod 40, and have buckle assemblies 120 for the purpose of raising and lowering the restraining system 12. At the end of each of the straps 106, 107 is a clip 124, similar to clips 32 which fits in one of the logistic rails 23 to hold the straps in position. To raise the straps 106 and 107, the buckle assemblies 120 are released and the straps pulled up until the canvas 47 bunches at the top of the container carrying the belts 70, 72, 74 and 76 therewith.

During use, after the entire load or the desired portion of the load is placed within the container 10, the buckles 120 are released lowering the canvas 47 and the canvas 47 and rod 40 are slid within the container until adjacent the rear end of the load. Thereafter, the clips 32 are fixed to the side rails adjacent the end of the load and the buckles 78 are cinched pulling the straps 70, 72, 74 and 76 tightly against the load along with the canvas 47. It should be understood that the canvas 47 in addition to performing a dividing function also performs some restraining function on the load. Moreover, when the restraining device 12 is employed with small goods, such as small boxes, the canvas 47 serves the function of preventing small boxes or goods from slipping between the belts 70, 72, 74 and 76.

As seen in FIG. 4, the ends 150 of the side rails 36, 37 are overturned to prevent removal of the discs 42, 43 and thus, prevent the removal of the entire load retainer 12 from the vehicle container 10.

I claim:

1. A load restrainer, comprising: vertically extending support means adapted to be supported within a container, a plurality of horizontal restraining belts engaging said support means, fasteners on each end of said restraining belts cooperating with fasteners means adapted to be mounted on the container walls, and means permitting vertical adjustment of the belts with respect to the support means to accommodate different location fasteners within the container.

2. The load restrainer of claim 1, said support means having a guide bar at the top thereof, track means adapted to be mounted to the container side walls, said guide bar being slidable in said track means.

3. The load restrainer of claim 1, wherein said fastener means includes a plurality of rails having apertures therein.

4. The load restrainer of claim 1, wherein said support means includes a flexible sheet of material, horizontal slots in said support sheet for receiving the belts.

5. The load restrainer of claim 4, including means loosely holding the belts in said slots.

6. The load restrainer of claim 1, including means for drawing the support means to the top of the container for storage.

7. The load restrainer of claim 6, said means for drawing the support means including a draw strap, said draw strap having a fastener at the end thereof connectable with one of the fasteners within the container.

8. The load restrainer of claim 1, including side tracks adapted to be mounted to the container side walls for supporting said support means for horizontal movement, and means for preventing removal of the support means from the side tracks.

9. A load restrainer, comprising: fastener means adapted to be permanently fixed within a container, tracks adapted to be mounted within the upper section of such container, a support rod slidable in said tracks, a flexible support sheet suspended from said rod and having a plurality of horizontally extending slots therein, a plurality of horizontal belts extending through said slots, said belts having fasteners on the ends thereof adapted to be connected to fasteners in the container, means loosely fixing the belts within the slots to prevent their loss, and means for drawing the support sheet and belts to the top of the container for storage.

10. A load restrainer, comprising: a plurality of permanent fasteners, a support means adapted to be suspended from the top of a container, said support means including an endless belt of flexible material adapted to be extended a substantial distance across the container, said flexible belt having horizontal straps where the sides of the belt are fixed together forming horizontal pockets in the support belt, and a plurality of horizontal restraining belts in the pockets.

11. The load restrainer of claim 10, wherein said belts have fasteners at each end thereof.

12. The load restrainer of claim 10, wherein said support belt is canvas.

13. A load restrainer, comprising: a sheet of flexible support material suspended from the upper reaches of a container, a plurality of horizontally disposed belts carried by said support means, fasteners at each end of said belts, a vertically extending strap for pulling the support and the belts to the upper reaches of a container, said strap having a fastener at the end thereof for attachment to the container.

14. The load restrainer of claim 13, wherein said strap has loops that fit around each of said belts.

15. The load restrainer of claim 13, wherein said strap is loosely fixed to the belts.

*16. A load restrainer for use in a lading-carrying vehicle having longitudinal side, top and bottom walls enclosing a lading-containing space; said load restrainer comprising, in combination:*

*a plurality of vertically spaced fastener means positioned along the side walls of the vehicle;*

*mounting means extending transversely of said lading-containing space adjacent the top wall of the vehicle and movable longitudinally within said space;*

*support means of flexible material suspended from said mounting means and extending a substantial distance across the width and height of the lading-containing space between the spaced side walls and spaced top and bottom walls of the vehicle;*

*a plurality of vertically-spaced, flexible, horizontal load restraining belts carried upon said mounting means; and*

*fastener members at the ends of each of said belts for selective connection to the vertically spaced fastener means along the side walls of the vehicle.*

*17. The load restrainer of claim 16, wherein said support means includes means defining a plurality of horizontally extending pockets, each for receiving one of said flexible horizontal belts.*

*18. The load restrainer of claim 16, wherein said fastener means comprises a plurality of pairs of longitudinally extending rails with one of each pair being mounted on each of the side walls, and each pair adapted to cooperate with the fasteners on the ends of a belt.*

*19. The load restrainer of claim 16, wherein said flexible material is foldable and said support means is retractable from the extended position, so that said support means can be selectively folded for placement in a stored-away position leaving the lading-containing space substantially unobstructed.*

*20. The load restrainer of claim 16 which includes means for tensioning the load restraining belts between the fastener means.*

*21. The load restrainer of claim 16, wherein said support means includes a horizontally extending loop of said flexible material along one edge of said support means for receiving said mounting means and suspending said support means from said mounting means.*

* * * * *